United States Patent Office 3,585,208
Patented June 15, 1971

3,585,208
MANUFACTURE OF BENZOXAZOLES
Fred H. Rash and Charles E. Swanson, Kingsport, Tenn., assignors to Eastman Kodak Company, Rochester, N.Y.
No Drawing. Filed Aug. 1, 1968, Ser. No. 749,281
Int. Cl. C07d 85/48
U.S. Cl. 260—307
8 Claims

ABSTRACT OF THE DISCLOSURE

Manufacture of 2-benzoxazoles by reacting an aromatic acid ester such as methyl p-toluate with an o-aminophenol in the presence of a catalytic amount of a tin or titanium esterification catalyst. The reaction is carried out at a temperature of about 150° C. to about 350° C., and the preferred catalyst is either a dialkyl tin oxide or a titanium tetra-alkoxide.

---

This invention relates to a novel chemical process, and more particularly, to a novel process for the manufacture of certain benzoxazoles. The benzoxazoles which are manufactured in accordance with the process of our invention can be represented by the formula

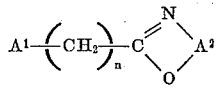

in which the substituent $A^1$ is a substituted or unsubstituted phenyl radical; $A^2$ is a substituted or unsubstituted ortho-phenylene radical; and $n$ is an integer from 0 to 1. The compounds represented by the foregoing formula are known chemical compounds which are useful as intermediates in the manufacture of fluorescent brighteners. Included among the compounds which can be made in accordance with the process of our invention is the compound 2-(p-tolyl)benzoxazole which is described in Canadian Patent 767,643; British Patent 1,072,918; and Japanese Patent 498,441 as being a useful intermediate in the manufacture of 4,4'-bis(benzoxazol-2-yl) stilbene. In accordance with the process of our invention, benzoxazoles of the foregoing formula are prepared by contacting an aromatic acid ester having the formula

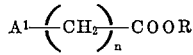

with an o-aminophenol having the formula $$HO—A^2—NH_2$$

at an elevated temperature. As noted hereinbefore the substituent $A^1$ is a substituted or unsubstituted phenyl radical; the substituent $A^2$ is a substituted or unsubstituted orthophenylene radical; and $n$ is an integer from 0 to 1. The substituent R is an alkyl group.

The substituted or unsubstituted phenyl radical $A^1$ can be represented by the formula

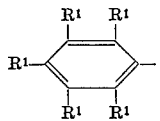

and the substituted or unsubstituted orthophenylene radical $A^2$ can be represented by the formula

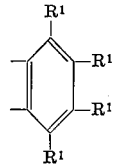

In the foregoing formulae for $A^1$ and $A^2$ the substituents $R^1$ can be hydrogen, alkyl of up to about 8 carbon atoms, cyano, alkyl sulfonyl of up to about 8 carbon atoms, or halogen and no more than 2 of the substituents $R^1$ on each of $A^1$ and $A^2$ are other than hydrogen. The alkyl groups represented by $R^1$ are typically methyl, ethyl, propyl, isopropyl, butyl, sec-butyl, tert-butyl, isobutyl, pentyl, hexyl, heptyl, octyl, 2-ethylhexyl, etc. $R^1$, when alkylsulfonyl, is typically methylsulfonyl, ethylsulfonyl, propylsulfonyl, isopropylsulfonyl, butylsulfonyl, isobutylsulfonyl, sec-butylsulfonyl, tert-butylsulfonyl, pentylsulfonyl, hexylsulfonyl, heptylsulfonyl, octylsulfonyl, 2-ethylhexylsulfonyl, etc. $R^1$, when halogen, is typically chlorine, fluorine, bromine, or iodine.

The substituent R of the aromatic acid ester is alkyl, typically alkyl of up to about 8 carbon atoms, such as methyl, ethyl, propyl, isopropyl, butyl, sec-butyl, tert-butyl, isobutyl, pentyl, hexyl, heptyl, octyl, 2-ethylhexyl, etc.

Typical of the aromatic acid esters which are useful in accordance with the process of our invention are methyl p-toluate, isobutyl p-toluate, ethyl phenyl acetate, methyl phenyl acetate, propyl benzoate, etc.

Typical of the o-aminophenols useful in accordance with the process of our invention are o-aminophenol, 3-methyl-2-aminophenol, 4-methyl-2-aminophenol, 5-methyl-2-aminophenol, 6-methyl-2-aminophenol, 4,5-dimethyl-2-aminophenol, 3-chloro-2-aminophenol, 4-bromo-2-aminophenol, 5-fluoro-2-aminophenol, 6-cyano-2-aminophenol, 3-methylsulfonyl-2-aminophenol, 5 - butylsulfonyl-2-aminophenol, etc.

The process of our invention is carried out by contacting the aromatic acid ester with the o-aminophenol at an elevated temperature in the presence of a catalytic amount of a tin or titanium compound. The elevated temperatures employed in accordance with our invention are typically about 150° C. to about 350° C. and preferably about 200° C. to about 250° C. Though stoichiometrically equivalent quantities of the reactants or an excess of either of the reactants can be employed in accordance with our invention, it is preferred to employ an excess of the aromatic acid ester. Preferably the excess of the aromatic acid ester is at least 100%, i.e., that is to say the molar ratio of the ester to the o-aminophenol is at least 2:1.

The process of our invention can be carried out either continuously or batchwise. In either event it is preferred to carry out the process of the invention in such a way that the water and the alcohol formed during the course of the reaction are continuously removed from the zone in which the reaction is carried out. In the case of aromatic acid esters of lower alkanols, for example, methyl p-toluate, ethyl p-toluate, etc., this can be accomplished by the use of an azeotroping or entraining agent such as benzene, toluene, xylene, etc. In the case of higher esters, for example, esters of aromatic acids with alkanols such as isobutanol, pentanol, 2-ethylhexanol, etc., the alcohol which is formed during the course of the reaction can serve as the azeotroping agent or, if desired, an additional entraining agent can be added. It is frequently considered desirable to condense the vapors which evolve from the reaction zone and to decant the azeotroping agent from the condensed water and alcohol and return the azeotroping agent to the reaction zone.

The process of our invention can be carried out at subatmospheric, atmospheric, or superatmospheric pressures. For convenience, it is preferred to carry out the process of our invention at atmospheric pressure.

The tin compounds which are useful as catalysts in the process of our invention are well known and are those tin compounds which have heretofore been used as catalysts in esterification, polyesterification, alcoholysis and acidolysis reactions. Such tin compounds are disclosed in U.S. Pat. 2,720,507 and British Pat. 810,831. The tin compounds which are useful in accordance with our invention also include tin salts of organic acids, e.g., stannous oxalate, etc. Preferred among the tin compounds are dialkyl tin oxides, especially those in which the alkyl moieties contain 1 to about 8 carbon atoms. Typical of these preferred tin compounds is dibutyltin oxide.

The titanium compounds which are useful in accordance with our invention are also well known as esterification, polyesterification, alcoholysis, and acidolysis catalysts. These compounds are disclosed in U.S. Pat. 3,056,818. Especially preferred among the titanium compounds are titanium tetraalkoxides, especially those in which the alkyl moieties contain 1 to about 8 carbon atoms, such as titanium tetraisopropoxide, etc.

The following examples illustrate the process of our invention.

EXAMPLE I

To a stirred 5 l. flask fitted with a 10 in. packed column and a Dean-Stark trap were added 327 g. (3.0 moles) of o-aminophenol, 2250 g. (15 moles) of methyl p-toluate, 200 ml. of xylene, and 5 g. of dibutyltin oxide. The mixture was refluxed and the liquid which collected in the Dean-Stark trap was removed. However, enough xylene was retained in the column to maintain a head temperature of 120–136° C. The base temperature did not exceed 235° C. After 4 hours, the reaction appeared to be complete. Distillation at reduced pressure gave 1800 g. of recovered methyl p-toluate (>97% assay), 594 g. of 2-(p-tolyl)-benzoxazole (87.5% assay), and only 19 g. of residue. The conversion to benzoxazole was 83% based on o-aminophenol charged and 17% based on ester charged. The yield of 2-(p-tolyl)-benzoxazole was 88% based on o-aminophenol and 83% based on methyl p-toluate.

EXAMPLE II

Example I was repeated on the same scale using 5 g. of titanium tetraisopropoxide as catalyst instead of dibutyltin oxide. The reaction time was 3.5 hours. Vacuum distillation gave recovered ester, product benzoxazole, and 31 g. of residue. The conversion to benzoxazole was 82% based on o-aminophenol charged and 16% based on ester charged. The yield of 2-(p-tolyl)benzoxazole was 89% based on o-aminophenol and 92% based on methyl p-toluate.

EXAMPLE III

In the apparatus described in Example I were placed 327 g. (3.0 moles) of o-aminophenol, 2600 g. (13.5 moles) of isobutyl p-toluate, and 5 g. of titanium tetraisopropoxide. The mixture was refluxed. No xylene was used but enough isobutyl alcohol was left in the column to maintain the head temperature at 90–105° C. The maximum base temperature was 247° C. After 2 hrs., no more water was formed and the mixture was distilled to give a 75% conversion of o-aminophenol to 2-(p-tolyl)benzoxazole.

EXAMPLE IV

A mixture of 54.6 g. (0.5 mole) of o-aminophenol, 375.5 g. (2.28 moles) of ethyl phenyl acetate, 1 g. of dibutyltin oxide, and about 50 ml. of xylene was refluxed at 200–230° C. Xylene, ethanol, and water were removed from the Dean-Stark trap but enough xylene was left in the column to aid in removal of water. After 4.5 hrs., the mixture was distilled to give 263 g. of recovered ester, 93.6 g. of 2-benzylbenzoxazole, and 10 g. of residue. The conversion to benzoxazole was 89% based on o-aminophenol charged and 20% based on ester charged. The yield of 2-benzylbenzoxazole was 89% and 73% based on o-aminophenol and ester, respectively.

The invention has been described in detail with particular reference to preferred embodiments thereof, but it will be understood that variations and modifications can be effected within the spirit and scope of the invention as described hereinabove and as defined in the appended claims.

We claim:

1. The process which comprises contacting an ester of an aromatic acid having the formula:

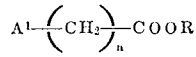

with an aminophenol having the formula:

$$HO—A^2—NH_2$$

at a temperature of about 150° C. to about 350° C. in the presence of a dialkyl tin oxide in which the alkyl moieties contain 1 to about 8 carbon atoms or a titanium tetra-alkoxide in which the alkyl moiety contains from 1 to about 8 carbon atoms, as a catalyst, and obtaining a benzoxazole of the formula:

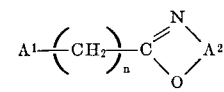

wherein $A^1$ is a radical of the formula:

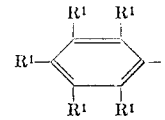

and $A^2$ is a radical of the formula:

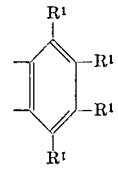

wherein R is alkyl having from 1 to about 8 carbon atoms, $R^1$ is hydrogen, alkyl having from 1 to about 8 carbon atoms, cyano, alkyl sulfonyl of up to about 8 carbon atoms, or halogen, and no more than two of the substituents $R^1$ on each of $A^1$ and $A^2$ are other than hydrogen, and $n$ is an integer from 0 to 1.

2. The process of claim 1 in which the water and alcohol formed during the course of the reaction are continuously removed as they are formed.

3. The process of claim 1 in which a stoichiometric excess of said ester is contacted with said o-aminophenol.

4. The process of claim 1 in which said ester and said o-aminophenol are contacted at a temperature of about 200° C. to about 250° C.

5. The process of claim 1 in which the molar ratio of said ester to o-aminophenol is at least 2:1.

6. The process according to claim 1 in which 2-(p-tolyl)benzoxazole is formed by contacting a stoichiometric excess of methyl p-toluate with o-aminophenol at a temperature of about 200° C. to about 250° C. in the presence of a catalytic amount of dibutyl tin oxide or titanium tetraisopropoxide.

7. The process according to claim 1 in which 2-(p-tolyl)benzoxazole is formed by contacting a stoichiometric excess of isobutyl p-toluate with o-aminophenol at a temperature of about 200° C. to about 250° C. in the presence of a catalytic amount of dibutyl tin oxide or titanium tetraisopropoxide.

8. The process according to claim 1 in which 2-benzylbenzoxazole is formed by contacting a stoichiometric excess of ethyl phenylacetate with o-aminophenol at a temperature of about 200° C. to about 250° C. in the presence of a catalytic amount of dibutyl tin oxide or titanium tetraisopropoxide.

References Cited
UNITED STATES PATENTS
3,278,547 10/1966 Brown _____ 260—309.2

ALEX MAZEL, Primary Examiner
R. V. RUSH, Assistant Examiner